(No Model.)
A. REICHLE.
TWO WHEELED VEHICLE.
No. 286,734. Patented Oct. 16, 1883.
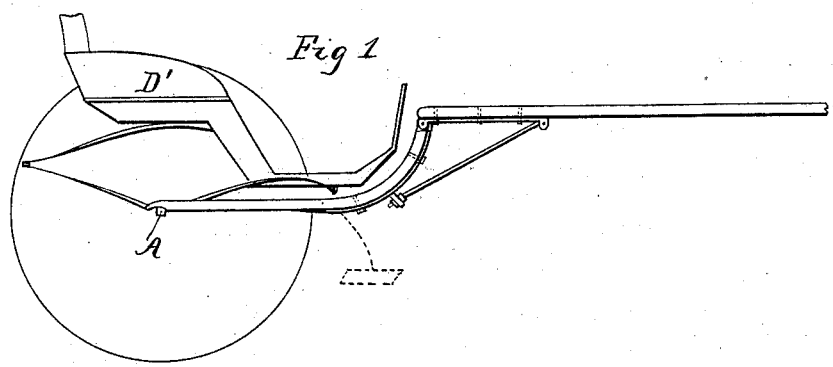
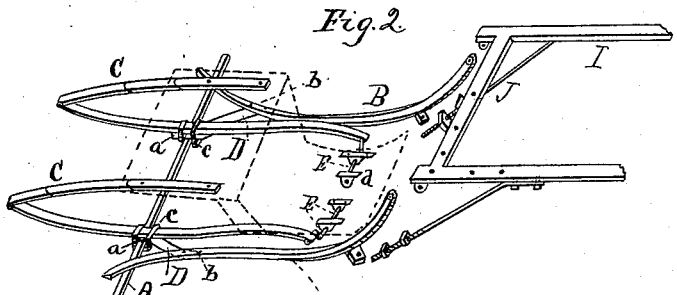
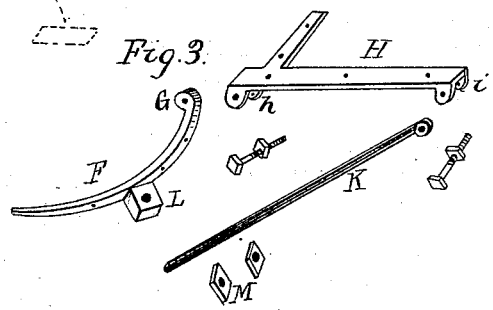
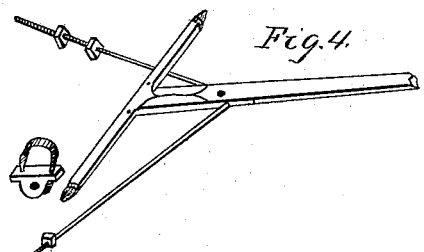
Attest:
H. Sprague
E. Scully
Inventor.
Adolph Reichle.
By Thos. L. Sprague
Att'y

UNITED STATES PATENT OFFICE.

ADOLPH REICHLE, OF DETROIT, MICHIGAN.

TWO-WHEELED VEHICLE.

SPECIFICATION forming part of Letters Patent No. 286,784, dated October 16, 1883.

Application filed June 16, 1883. (No model.)

*To all whom it may concern:*

Be it known that I, ADOLPH REICHLE, of Detroit, in the county of Wayne and State of Michigan, have invented new and useful Improvements in Two-Wheeled Vehicles; and I do hereby declare that the following is a full, clear, and exact description thereof, reference being had to the accompanying drawings, which form a part of this specification.

This invention relates to certain new and useful improvements in the construction of two-wheeled vehicles; and the invention consists in the peculiar construction and arrangement of the side bars and springs for supporting the body, and in the various combinations of the parts, all as more fully hereinafter set forth.

Figure 1 is a side elevation of my invention, with the wheels in outline. Fig. 2 is a perspective with the wheels removed and the body shown in dotted outline. Fig. 3 shows detached perspectives of the devices employed for securing the shaft to the forward end of the side bars. Fig. 4 is a perspective showing the manner of securing a tongue.

In the accompanying drawings, which form a part of this specification, A represents the axle, which is mounted upon suitable wheels. B represents the side bars of the vehicle, the front ends of which curve upward, while the rear ends thereof curve outwardly and are rigidly secured to the axle by clips or otherwise.

C represents semi-elliptic platform-springs, which rest upon the spring-blocks $a$ on top of the axle A; and D are brace-rods, the forward ends of which are rigidly secured to the side bars, as at $b$, while the rear ends thereof pass between the spring-blocks $a$ and the axle, being secured to place by the clips $c$, which also rigidly secure such spring-blocks and springs to the axle. The forward ends of the upper portions or members of these springs C are rigidly secured by bolts or otherwise to the bottom of the body D' immediately beneath the seat-section, while the forward ends of the lower portions of such springs are sleeved upon the outer ends of compensating crank-rods E, said rods being secured to the bottom of the foot-section of the body by means of box-bearings $d$.

To the forward ends of the side bars, B, I rigidly secure a similarly-shaped strap-iron, F, the upper end of which terminates in an eye, G. H represents an L strap-iron, which is rigidly secured to the shafts I and cross-bar J thereof, as in the usual manner, both ends of that portion of such strap-iron as is secured to the shaft proper being provided with downwardly-projecting ears $h$ $i$, into the former of which the eyes G upon the upper ends of the side bars project or enter, and are secured to place by a proper bolt. Between the ears $i$, I insert the forward end of an adjusting-rod, K, which is provided with an eye, through which a suitable bolt passes to secure such rod in place. The opposite end of this rod K is threaded and passes loosely through a hole in the stud L, which projects from the outer face of the strap-iron F; and the threaded end of this rod K receives two nuts, M, one upon either side of the stud. By this means of connecting the shaft to the side bars, it will be seen that by lengthening or contracting the distance between the eyes $i$ and the stud L through the medium of the rod K the forward ends of the shafts will be raised or lowered, thus suiting the vehicle to the size of the animal being driven.

In Fig. 4 I show the means for securing a tongue in place, the use of which I do not consider as a departure from the spirit of my invention.

One of the advantages to be found in the use of this construction is the great facility in shipping, as the parts may be readily detached and packed in a small compass.

What I claim as my invention is—

1. In a two-wheeled vehicle, the combination, with each side spring, of a compensating crank-rod working independently of the crank-rod of the opposite side spring, whereby the motion of one spring is prevented from affecting the other, substantially as described.

2. In a two-wheeled vehicle, the combination, with the side bars and thills, of the iron F, having eye G, and stud L, the strap-iron having ears $h$ and $i$, and the threaded bar K, pivoted at one end in the ears $i$, and the other end adapted to be held in the hole in the stud L, and provided with adjusting-nuts M, substantially as and for the purpose specified.

3. The combination, in a two-wheeled vehicle, of the axle A, side bars, B, turned outwardly at their rear ends, the semi-elliptic platform-springs C, and the brace-bars D, diverging from the springs toward the side bars, substantially as specified.

4. The combination, in a two-wheeled vehicle, of the axle A, side bars, B, turned outwardly at their rear ends, the semi-elliptic platform-springs C, brace-bars D, compensating crank-rods E, provided with bearings $d$, and the shaft I, when constructed and arranged substantially in the manner described.

ADOLPH REICHLE.

Witnesses:
H. S. SPRAGUE,
E. SCULLY.